United States Patent [19]
Urlings et al.

[11] 3,880,693
[45] Apr. 29, 1975

[54] PROCESS FOR BONDING TOGETHER FILMS BASED ON CURED BUTYL RUBBER, POLYCHLOROPRENE AND/OR RUBBER-LIKE COPOLYMERS OF ETHYLENE, AT LEAST ONE OTHER ALPHA-ALKENE AND, OPTIONALLY, ONE OR SEVERAL POLYENES

[75] Inventors: Pierre M. G. J. Urlings, Sittard; Marinus J. R. Visseren, Geleen, both of Netherlands

[73] Assignee: Stamicarbon, B.V., Geleen, Netherlands

[22] Filed: Apr. 26, 1973

[21] Appl. No.: 354,908

[30] Foreign Application Priority Data
Apr. 26, 1972 Netherlands.................... 7205623

[52] U.S. Cl. ................ 156/273; 156/333; 156/334
[51] Int. Cl. ........................... B29h 8/00; C09j 3/12
[58] Field of Search ....... 156/272, 338, 110 A, 273, 156/333, 308, 309

[56] References Cited
UNITED STATES PATENTS

| | | |
|---|---|---|
| 3,429,769 | 2/1969 | Ippen et al......................... 156/338 |
| 3,528,867 | 9/1970 | Leatherman et al................ 156/272 |
| 3,574,031 | 4/1971 | Heller, Jr. et al................... 156/272 |
| 3,620,875 | 11/1971 | Guglielmo, Sr. et al............ 156/272 |
| 3,649,438 | 3/1972 | Walker et al....................... 156/272 |
| 3,660,224 | 5/1972 | Cau et al. ........................ 156/110 A |

Primary Examiner—Charles E. Van Horn
Assistant Examiner—M. G. Wityshyn
Attorney, Agent, or Firm—Cushman, Darby & Cushman

[57] ABSTRACT

A process for bonding together cured rubbery films is disclosed, wherein cured polychloroprene, butyl rubber, and/or rubbery copolymers of ethylene with at least one other alpha-alkene of 3 to 8 carbon atoms are bonded together by placing a layer of a curable rubbery polymer composition which generates heat upon exposure to a high frequency electric field between the films and heating the assembly of films under pressure in an electric field having a frequency of about 0.1 to about 500 megacycles per second. The time of heating can be appreciably shortened without diminishing the strength of the bond between the films, and without film damage.

The bonded films are suitable for sealing and lining applications.

14 Claims, No Drawings

PROCESS FOR BONDING TOGETHER FILMS BASED ON CURED BUTYL RUBBER, POLYCHLOROPRENE AND/OR RUBBER-LIKE COPOLYMERS OF ETHYLENE, AT LEAST ONE OTHER ALPHA-ALKENE AND, OPTIONALLY, ONE OR SEVERAL POLYENES

BACKGROUND OF THE INVENTION

The present invention relates to a process for bonding together films based on cured butyl rubber, polychloroprene and/or rubbery copolymers of ethylene with at least one other alpha-alkene (and optionally one or more polyenes) by inserting a curable rubbery polymer between the films to be bonded and thereafter heating the assembly of films under pressure.

The synthetic rubbery polymers polychloroprene and butyl rubber are well known in the art. The rubbery copolymers of ethylene and at least one other alpha-alkene and, optionally, one or more polyenes, are also well known to the art, being prominent among synthetic rubbery polymers because of good physical and mechanical properties, excellent resistance to ozones and weathering, and chemical inertness after being cured. Because of these favorable properties, such rubbery ethylene copolymers are eminently suited for various sealing and lining applications including, for instance, covering material for roofs, terraces and floors, and as a lining for ponds, artificial lakes and water basins.

The properties of polychloroprene and butyl rubber are also favorable and render these rubbery polymers suitable for the same applications as mentioned above.

For these various rubbery polymers to be used as a sealing or lining materials on large surfaces, it is essential that an appropriate industrial process is available for bonding films of the polymers together in order to form a larger assembly.

The prior art has previously developed a number of various processes for bonding films based on cured butyl rubber, polychloroprene, or rubbery ethylene copolymers together to form a larger assembly.

An extensively used process involves the insertion of a layer of a curable rubbery polymer, in which at least one curing agent has been incorporated, between the films which are to be bonded together, and thereafter heating the assembly of films and the curably rubbery polymer under pressure until a sufficiently strong bond is developed. This step is normally conducted by placing the assembly of films in a heated press. The heat of the press is transmitted via the current rubbery films to the uncured rubbery polymer which undergoes a curing or cross-linking reaction, bonding the films together.

The heating time required to make a sufficiently strong bond is dependent upon various factors such as the thickness of the films which are to be bonded and the thickness of the uncured rubbery polymer, but is primarily dependent upon the press temperature. The higher the press temperature, the shorter is the time required to produce the desired strong bond. However, the press temperature is limited to a maximum temperature which is the temperature at which the films which are to be bonded together will not become damaged by scorching. Under practical conditions it normally takes at least 30 seconds for a sufficiently strong bond to be produced by this process, even at maximum press temperatures.

SUMMARY OF THE INVENTION

The present invention involves an improved process for bonding together films of rubbery polymers by using an intermediate curable rubbery polymer composition. The intermediate curable rubbery polymer composition must generate heat upon exposure to a high frequency electric field. Certain polymers have the property of generating heat upon exposure to such a field, and other polymers require the addition of an appropriate additive.

The assembly of films and the intermediate uncured rubbery polymer is subjected to an electric field having a frequency of 0.1 to about 500 megacycles per second for a time sufficient to cure the intermediate rubbery polymer composition, thereby bonding the films together.

DESCRIPTION OF THE INVENTION

The present invention is directed to a process for bonding together cured films selected from the group consisting of polychloroprene, butyl rubber, rubbery copolymers of ethylene with at least one other alpha-alkene of 3 to 8 carbon atoms, and mixtures thereof. The process permits appreciably shorter heating times to be used to produce bonded films of excellent strength. The process allows the bonding of such films using reduced heating times to form strong bonds in a manner which is less dependent upon the thickness of the films which are to be bonded, so that films of more than minimal thickness can be rapidly bonded together.

The cured films are bonded together by placing between the films which are to be bonded a layer of a curable rubbery polymer composition in which at least one curing agent is incorporated and which generates heat upon exposure to a high frequency electric field, and heating the assembly of films in an electric field having a frequency of about 0.1 to about 500 megacycles per second.

Surprisingly, it has been found that with the use of the high frequency electric field for heating, the heating times can be appreciably shortened without detracting from the strength of the bonded films and without scorching damage occurring to the films.

The heating step in the high frequency electric field can be conducted in any suitable equipment for producing such fields. The frequencies of the electric field that can be used in the process of the present invention may vary within wide limits. It is preferred to use an electric field of a frequency between 0.1 and 500 megacycles per second, although higher and lower frequencies may also be used. Most preferably, the electric field has a frequency of about 27 megacycles per second.

The films which are bonded together by the process of the present invention are films based on cured polychloroprene, butyl rubber, rubbery copolymers of ethylene with at least one other alpha-alkene of 3 to 8 carbon atoms (and optionally one or more polyenes) and mixtures thereof. Generally, the films will be 0.2 to 20, preferably 0.3 to 10, mm thick.

The rubbery copolymers of ethylene with at least one other alpha-alkene of 3 to 8 carbon atoms may contain one or more polyenes. These rubbery copolymers may be prepared by various known methods, generally by the use of a catalyst system based upon compounds of transition metals, such as vanadium and titanium halides and lower alcoholates and the like, and organic aluminum compounds, such as aluminum lower alkyls and lower alkyl aluminum halides including aluminum alkyl chlorides, aluminum alkyl bromides and aluminum alkyl iodides. Generally, these rubbery copolymers contain from 20 to 85 mole % of ethylene, 15 to 80 mole % of 1 or more other alpha-alkenes and 0 to 10 mole % of one or more polyenes. Examples of rubbery copolymers include copolymers of ethylene with propylene and/or butylene-1, optionally with one or more polyenes. Suitable polyenes include hexadiene-1,4, butadiene-1, 3, dicyclopentadiene and a alkylidene norbornene, such as 5-ethylidene norbornene-2, 5-isopropylidene norbornene-2 and 5-propenyl norbornene-2. Preference is given to copolymers containing dicyclopentadiene or 5-ethylidene norbornene-2 as the polyene. The rubbery copolymers of this type may not contain any polyenes, with rubbery copolymers of ethylene with propylene and/or butylene-1 being eminently suitable. The results obtained with the rubbery copolymers marketed by Stamicarbon, N.V. under the trade name "KELTAN" are particularly good. Preparation of these polymers is known to the art, for instance, see U.S. Pat. Nos. 3.472.823, 3.506.629, and 3.705.138, the disclosure of which are hereby incorporated by reference for the teaching of the processes, as well as the teaching of rubbery copolymers, therein.

Butyl rubber is well known to the art and can be suitably prepared by the polymerization of isobutylene with minor amounts of a diolefine, such as isoprene, using a Friedel-Crafts catalyst at low polymerization temperatures. Note, in this regard, U.S. Pat. Nos. 2.203.873, 2.559.062, and 2.856.394, the disclosures of which are hereby incorporated by reference for the teachings of butyl rubber therein and the process of making the same.

Polychloroprene can be suitably made by the emulsion polymerization of 2-chloro-1,3-butadiene. Note, for instance, U.S. Pat. Nos. 1.967.861, 2.264.173, and 2.965.604, the disclosures of which are hereby incorporated by reference for the teachings of polychloroprene and processes for making the same therein.

The vulcanization of butyl rubber and of rubbery copolymers with ethylene with at least one other alpha-alkene is conventionally carried out with systems in which sulphur and/or peroxides are incorporated. Accelerators and/or retardants may also be present during vulcanization. Polychloroprene is conventionally cured in the presence of zinc and/or magnesium oxide, optionally in the presence of accelerators such as antimony disulphide.

The layer of curable rubbery polymer which may be inserted between the films which are to be bonded according to the present invention may consist of any heatcurable rubbery polymer which generates heat upon exposure to a high frequency electric field. The curable rubbery polymer normally contains at least one curing agent therein, and suitable curing agents are well known to those in the art. The intermediate layer of curable rubbery polymer is generally about 0.2 to 8 mm thick, preferably 0.3 to 5 mm thick. Examples of suitable curable rubbery polymers include the rubbery copolymers of ethylene with at least one other alpha-alkene of 3 to 8 carbon atoms (and optionally one or more polyenes) described hereinabove, halogenated derivatives of these rubbery ethylene copolymers, polychloroprene, butyl rubber, chlorobutyl rubber, bromobutyl rubber, acrylate rubbers, copolymers of butadiene and acrylonitrile, natural rubber and diene rubbers such as polyisoprene, polybutadiene, and copolymers of butadiene and styrene. Reclaims of such copolymers may also be used. Mixtures of two or more of the curable rubbery polymers, such as those described above, may also be used with good results.

Further description of suitable rubbery polymers which can be used in the process of the present invention may be found in Synthetic Rubber technology, Vol. I, by W. S. Penn, Maclaren and Sons, Ltd, London (1960) and Linear and Stereoregular Addition Polymers, N. G. Gaylord et al., Innerscience Publishers, New York (1959), the disclosures of which are hereby incorporated by reference. In general, these rubbery polymers will contain one or more curing agents which cure or cross-link the polymer upon the application of heat, and the curable rubbery polymer composition generates heat upon exposure to a high frequency electric field. Normally, the rubbery polymer when uncured will have a molecular weight ($M_w$) of about $10^4$ to $10^7$, preferably about $10^5$ to $10^6$.

The curable rubbery polymer of the layer which is placed between the films which are to be bonded together is preferably a curable rubbery polymer which, when cured, is identical to, or chemically related to, the rubbery polymers of which the films which are to be bonded are composed. For instance, when the films are based upon rubbery copolymers of ethylene with at least one other alpha-alkene and, optionally, one or more polyenes, it is preferred to use uncured rubbery copolymers of ethylene with at least one other alpha-alkene and, optionally, one or more polyenes, or halogenated derivatives of such copolymers, as the curable rubbery polymer for the intermediate layer. In addition, in the case of films of such rubbery ethylene copolymers, very good results can be obtained by using an intermediate bonding layer based upon uncured butyl rubber. It is preferred to use uncured polychloroprene to bond films of polychloroprene, while for the bonding of films based upon butyl rubber, it is preferred to use uncured butyl rubber or uncured rubbery copolymers of ethylene with at least one other alpha-alkene and, optionally, one or more polyenes, as described above, or halogenated derivatives of such uncured rubbery ethylene copolymers. By using intermediate bonding layers which are the same as or chemically related to the polymers of the films, the elastic properties of the resulting bonding layer lie at the same, or substantially the same, level as the films which are bonded together.

The layer of curable rubbery polymer should contain at least one curing agent. Examples of suitable curing agents that may be used in the curable rubbery polymer are peroxides, such as benzoyl peroxide, and/or sulphur and/or metal oxides, such as zinc oxide or magnesium oxide. These curing agents are preferably used in amounts of about 0.5 to 5% by weight, based on the amount of uncured rubbery polymer. Conventionally, accelerators and/or retardants may also be present in the uncured robbery polymer composition, including such compounds as zincbutyldithiocarbamate, 2-mercaptobenzthiazole, tetra methylthiuramdisulphide, guanidine and guanidine derivatives.

In the practice of the process of the present invention, it is critical for the intermediate layer of curable rubbery polymer which is to be inserted between the films which are to be bonded to generate heat during exposure to a high frequency electric field. In some instances the generation of heat during exposure to a high frequency electric field will be achieved with the curable rubbery polymer itself, as in the case of polychloroprene and chlorobutyl rubber. In many instances, however, it is necessary to add polar compounds to the uncured rubbery polymer for such heat generation. Examples of suitable compounds which may be incorporated for this purpose into the uncured polymer include carbon black chloroparaffins of 15 to 50 carbon atoms and with 50 to 75 % chlorine, chlorinated polyolefins such as chlorinated polyethylene, polyvinylchloride, glycols such as ethylene glycol and propylene glycol, and plasticizers such as dioctylphtalate. Of course, mixtures of two or more compounds which generate heat upon exposure to a high frequency electric field may be used if desired. Normally, these compounds will be present in an amount of from 10 to 900 % by weight, based on the amount of uncured rubbery polymer. It is preferred to use carbon black as the agent to generate heat, especially at amounts of about 20 to 200% by weight based on the amount of uncured rubbery polymer.

For optimum results of the process of the present invention, it is essential for the layer of curable rubbery polymer to generate more heat upon exposure to a high frequency electric field than the films which are to be bonded. Particularly good results have been obtained using carbon black type FEF in the films which are to be bonded and carbon black types HAF or ISAF in the layer of uncured rubbery polymer.

For optimum results, the assembly of films and uncured rubbery polymer should be heated under a contact pressure of at least 1 kgs/cm², preferably 5 to 15 kgs/cm², and higher pressures, such as 20 kgs/cm² or even higher, may be used if desired.

The layer of uncured rubbery polymer may also contain, in addition to the curing agents and any compounds which generate heat during exposure to a high frequency electric field, conventional rubber additives such as, for instance, reinforcing or non-reinforcing fillers such as carbon black, clay and silicates, pigments, stabilizers, lubricants, tackifiers and diluting oils. Some additives may be used for multiple effects; for instance, the carbon black serves as a filler as well as a compound which generates heat upon exposure to a high frequency electric field.

EXAMPLES OF THE INVENTION

The invention will be more clearly understood with reference to the following examples which are intended to illustrate but not limit the invention.

EXAMPLE 1

A series of experiments were conducted wherein films of cured rubbery ethylene/propylene terpolymers were bonded together by a layer of curable rubbery material of the following composition:

| | |
|---|---|
| butyl rubber (Polysar 600) | 100 parts by weight |
| polyisobutylene (Vistanex 80) | 15 parts by weight |
| zinc oxide | 5 parts by weight |
| carbon black (SRF) | 50 parts by weight |
| twice-washed whitening | 100 parts by weight |
| paraffin oil (Sunpar 150) | 10 parts by weight |
| tackifier (Amberol, 140 F) | 5 parts by weight |
| alkylphenol resin (Staybelite resin) | 5 parts by weight |
| mercaptobenzthiazole | 0.8 part by weight |
| tetramethylthiuramdisulphide | 1.6 parts by weight |

-Continued

| | |
|---|---|
| telluriumdiethyldithiocarbamate | 0.8 part by weight |
| sulphur | 1.7 parts by weight |

The cured rubbery ethylene/propylene terpolymer films were marketed by the Hertel Company under the designation "Hertelan" films, and have the following properties:

| | |
|---|---|
| 100 % modulus | 16 kg/cm² |
| 300 % modulus | 48 kg/cm² |
| tensile strength | 99 kg/cm² |
| elongation at rupture | 620 % |
| permanent set | 6 % |
| thickness | 1.63 ± 0.03 mm. |

A bond of the curable rubbery polymer 1,3 mm. thick and 10 mm. wide was applied to one edge of the Hertelan film and then the edge of a second piece of Hertelan film was applied over the uncured butyl rubber composition. The film assembly was placed in a Pfaff 8,560 HF Schweissmaschine with a maximum capacity of 4 kW, using an electrode having a surface area of 400 × 12 mm thick and an electric field frequency of 27 megacycles per second. The contact pressure was 10.41 kgs/cm².

The following results were obtained ("bond" quality was subjectively determined):

| voltage applied to electrode | time sec. | bond quality |
|---|---|---|
| 800 | 7 | good |
| 860 | 5 | good |
| 890 | 4 | good |

EXAMPLE 2

Example 1 was repeated using the following curable rubbery polymer composition for the intermediate layer:

| | |
|---|---|
| Rubber-like ethylene/propylene terpolymer (KELTAN 514), with 36 % by weight of propylene and 9 % by weight of 5-ethylidene norbornene-2 | 100 parts by weight |
| zinc oxide | 5 parts by weight |
| stearic acid | 1 part by weight |
| carbon black (FEF) | 50 parts by weight |
| silicate (Ultrasil VN 3) | 20 parts by weight |
| naphthenic oil (Sunthene 4240) | 30 parts by weight |
| tackifier (alkyl phenol resin) | 5 parts by weight |
| telluriumdiethyldithiocarbamate | 0.8 part by weight |
| dipentamethylenethiuramdisulphide | 0.8 part by weight |
| tetramethylthiuramdisulphide | 0.8 part by weight |
| mercaptobenzthiazole | 1.5 parts by weight |
| sulphur | 1.5 parts by weight |

The results obtained are as follows:

| electrode voltage | time sec. | bond quality |
|---|---|---|
| 760 | 5.5 | good |
| 800 | 5 | good |
| 860 | 3.5 | good |

EXAMPLE 3

Example 2 was repeated using a somewhat different rubbery ethylene terpolymer for the bonding layer. The rubbery ethylene terpolymer had the same composition as used in Example 2 except the curing system (sulphur and accelerators) was different, with the curing system of the curable rubbery polymer composition of Example 2 replaced by the following:

| | |
|---|---|
| zincbutyldithiophosphate | 2.5 parts by weight |
| diphenyldithiourea | 3 parts by weight |
| zincdibutyldithiocarbamate | 3 parts by weight |
| telluriumdiethyldithiocarbamate | 1 part by weight |
| sulphur | 1.75 parts by weight |

The results of the bond test were as follows:

| electrode voltage | time sec. | bond quality |
|---|---|---|
| 810 | 5 | good |
| 860 | 4 | good |

EXAMPLE 4

Example 2 was repeated except that rubbery ehtylene/propylene terpolymer films marketed by VEITH/PIERELLI under the designation "APETECT" were used in place of the HERTELAN films. The APETECT films, about 1,5 mm. thick, contain also a white filler and have the following properties:

| | |
|---|---|
| 300 % modulus | 54 kg/cm$^2$ |
| tensile strength | 82 kg/cm$^2$ |
| elongation at rupture | 550 % |
| thickness | 150 ± 0,03 mm. |

The result of the bond test was as follows:

| electrode voltage | time sec. | bond quality |
|---|---|---|
| 920 | 9 | good |

What is claimed is:

1. In a process for bonding together cured films of a rubbery polymer selected from the group consisting of polychloroprene, butyl rubber, rubbery copolymers of ethylene with at least one other alpha-alkene of 3 to 8 carbon atoms, and mixtures thereof, by placing between the films to be bonded a layer of a curable rubbery polymer and thereafter heating the assembly of films under a pressure of at least 1 kgs/cm$^2$, the improvement comprising using a curable rubbery polymer composition which generates heat upon exposure to a high frequency electric field, and heating the assembly of films in an electric field having a frequency of about 0.1 to about 500 megacycles per second for a time at least sufficient to cure the curable rubbery polymer.

2. Process according to claim 1 wherein said electric field has a frequency of about 27 megacycles per second.

3. Process according to claim 1, wherein the curable rubbery polymer, when cured, is substantially identical to the rubbery polymer of the cured films.

4. Process according to claim 1, wherein the cured film is a rubbery copolymer of ethylene with at least one other alpha-alkene with 3 to 8 carbon atoms.

5. Process according to claim 4, wherein said rubbery copolymer of ethylene contains about 20 to 85 mole % of ethylene units, about 15 to 80 mole % of units of at least one other alpha-alkene and about 0 to 10 mole % of at least one polyene of 4 to 20 carbon atoms.

6. Process according to claim 5 wherein the curable rubbery polymer is butyl rubber.

7. Process according to claim 5 wherein the curable rubbery polymer is an uncured rubbery copolymer of 20 to 85 mole % ethylene, 15 to 80 mole % of at least one other alpha-alkene of 3 to 8 carbon atoms, and to 10 mole % of at least one polyene of 4 to 20 carbon atoms.

8. Process according to claim 1, wherein said rubbery polymer of the cured films is butyl rubber.

9. Process according to claim 8, wherein the curable rubbery polymer is butyl rubber.

10. Process according to claim 8, wherein the curable rubbery polymer is a rubbery copolymer of 20 to 85 mole % of ethylene, 15 to 80 mole % of at least one other alpha-alkene of 3 to 8 carbon atoms, and 0 to 10 mole % of at least one polyene of 4 to 20 carbon atoms.

11. Process according to claim 1, wherein the curable rubbery polymer composition contains about 20 to about 200% by weight of carbon black based on the amount of curable rubbery polymer.

12. Process according to claim 1, wherein said rubbery polymer of the cured films is polychloroprene.

13. Process according to claim 12, wherein the curable rubbery polymer is polychloroprene.

14. Process according to claim 1, wherein the curable rubbery polymer compound generates more heat upon exposure to the high frequency electric field than the cured films.

* * * * *